US007614444B2

(12) United States Patent
Oldenburg

(10) Patent No.: US 7,614,444 B2
(45) Date of Patent: Nov. 10, 2009

(54) RAPID THERMAL CYCLING DEVICE

(76) Inventor: Kevin R. Oldenburg, 665 Riverpoint Blvd., Spokane, WA (US) 99202

( * ) Notice: Subject to any disclaimer, the term of this patent is extended or adjusted under 35 U.S.C. 154(b) by 992 days.

(21) Appl. No.: 10/842,053

(22) Filed: May 7, 2004

(65) Prior Publication Data

US 2005/0000804 A1 Jan. 6, 2005

Related U.S. Application Data

(63) Continuation-in-part of application No. 10/356,687, filed on Jan. 31, 2003, now Pat. No. 7,025,120, and a continuation-in-part of application No. 10/041,703, filed on Jan. 8, 2002, now abandoned.

(51) Int. Cl.
*G05D 23/19* (2006.01)

(52) U.S. Cl. .................... 165/269; 422/104; 435/287.2

(58) Field of Classification Search .................. 165/269
See application file for complete search history.

(56) References Cited

U.S. PATENT DOCUMENTS

| | | | | |
|---|---|---|---|---|
| 1,006,767 | A | 10/1911 | Mauger | |
| 1,456,005 | A | 5/1923 | Harris | |
| 2,379,474 | A | 7/1945 | Bramson | 237/3 |
| 3,379,118 | A | 4/1968 | Perez | 99/419 |
| 3,616,264 | A | 10/1971 | Ray | 195/127 |
| 4,038,055 | A | 7/1977 | Varano et al. | 55/197 |
| 4,116,777 | A | 9/1978 | Takátsy et al. | 195/127 |
| 4,286,456 | A | 9/1981 | Sisti et al. | 73/23.1 |
| 4,420,679 | A | 12/1983 | Howe | 219/400 |
| 4,468,423 | A | 8/1984 | Hall | 428/72 |
| 4,481,405 | A | 11/1984 | Malick | 219/405 |
| 4,683,195 | A | 7/1987 | Mullis et al. | 435/6 |
| 4,683,202 | A | 7/1987 | Mullis | 435/91 |
| 4,701,415 | A | 10/1987 | Dutton et al. | 435/289 |
| 4,865,986 | A | 9/1989 | Coy et al. | 435/290 |
| 4,889,818 | A | 12/1989 | Gelfand et al. | 435/194 |
| 4,902,624 | A | 2/1990 | Columbus et al. | 435/316 |
| 4,965,188 | A | 10/1990 | Mullis et al. | 435/6 |
| 4,981,801 | A | 1/1991 | Suzuki et al. | 435/290 |
| 5,038,852 | A | 8/1991 | Johnson et al. | 165/12 |
| 5,061,630 | A | 10/1991 | Knopf et al. | 435/290 |
| 5,236,666 | A | 8/1993 | Hulette et al. | 422/65 |
| 5,333,675 | A | 8/1994 | Mullis et al. | 165/12 |
| 5,432,086 | A | 7/1995 | Fränzl et al. | 435/291 |
| 5,455,175 | A | 10/1995 | Wittwer et al. | 435/286.1 |
| 5,489,532 | A | 2/1996 | Charm et al. | 435/286.1 |
| 5,525,300 | A | 6/1996 | Danssaert et al. | 422/99 |
| 5,601,141 | A | 2/1997 | Gordon et al. | 165/263 |
| 5,602,756 | A | 2/1997 | Atwood et al. | 364/500 |
| 5,604,130 | A | 2/1997 | Warner et al. | 435/286.7 |
| 5,681,492 | A | 10/1997 | Van Praet | 219/400 |
| 5,716,842 | A | 2/1998 | Baier et al. | 435/283.1 |
| 5,721,136 | A | 2/1998 | Finney et al. | 435/287.2 |
| 5,819,842 | A | 10/1998 | Potter et al. | 165/206 |
| 5,863,507 | A | 1/1999 | James | 422/104 |
| 5,939,312 | A | 8/1999 | Baier et al. | 435/287.2 |
| 6,153,426 | A | 11/2000 | Heimberg | 435/287.2 |
| 6,171,850 | B1 | 1/2001 | Nagle et al. | 435/286.1 |
| 6,197,575 | B1 | 3/2001 | Griffith et al. | 435/288.4 |
| 6,312,960 | B1 | 11/2001 | Balch et al. | 436/518 |
| 6,331,441 | B1 | 12/2001 | Balch et al. | 436/518 |
| 6,338,802 | B1 | 1/2002 | Bodner et al. | 210/650 |
| 6,372,486 | B1 | 4/2002 | Fripp | 435/303.1 |
| 6,423,536 | B1 | 7/2002 | Jovanovich et al. | 435/287.2 |
| 6,451,261 | B1 | 9/2002 | Bodner et al. | 422/99 |
| 6,479,301 | B1 | 11/2002 | Balch et al. | 436/518 |
| 6,489,112 | B1 | 12/2002 | Hadd et al. | 435/6 |
| 6,627,421 | B1 | 9/2003 | Unger et al. | 435/173.5 |
| 6,948,843 | B2 | 9/2005 | Laugharn, Jr. et al. | 366/127 |

OTHER PUBLICATIONS

Cao, T., "A Simple and Inexpensive System to Amplify DNA by PCR," *Biotechniques*, 7(6):566-7, Jun. 1989.

Chapin, K., et al., "Evaluation of a Rapid Air Thermal Cycler for Detection of *Mycobacterium tuberculosis," J Clin Microbiol.*, 35(8):2157-9, Aug. 1997.

Civitello, A., et al., "A Simple Protocol for the Automation of DNA Cycle Sequencing Reactions and Polymerase Chain Reactions," *DNA Seq.*, 3(1):17-23, 1992.

Constans, A., "Some Like it Hot: A Thermal Cycler Roundup," *The Scientist*, 15(24):32, Dec. 10, 2001.

Denton et al., PCR Protocols: A Guide to Methods and Applications, "A Low-Cost Air-Driven Cycling Oven," pp. 435-441, 1990.

Mai, M., et al., "Shortened PCR Cycles in a Conventional Thermal Cycler," *Biotechniques*, 25(2):208-10, Aug. 1998.

(Continued)

*Primary Examiner*—Ljiljana (Lil) V Ciric
(74) *Attorney, Agent, or Firm*—Seed IP Law Group PLLC

(57) ABSTRACT

A lid for a well plate is provided. A pin penetrates the lid and projects downwardly into a well of the well plate. An electrical charge is applied to the pin and an electrical charge of opposite polarity is applied to an electrically conductive portion of a corresponding well, generating a small flow of electrical current and corresponding electrical fields within the well. Charged materials, such as DNA, selectably are attracted to the pin and segregated from the liquid sample.

23 Claims, 16 Drawing Sheets

OTHER PUBLICATIONS

Merriam-Webster's Collegiate Dictionary, Tenth Edition, Merriam Webster Incorporated, 1996, p. 959.

Perry and Green, *Perry's Chemical Engineer's Handbook*, 7th ed., "Heat Transfer by Radiation," pp. 5-23 to 5-42, 1997.

Soper, S., et al., "Sanger DNA-sequencing Reactions Performed in a Solid-phase Nanoreactor Directly Coupled to Capillary Gel Electrophoresis," *Anal Chem.*, 70(19):4036-43, Oct. 1, 1998.

Tret'iakov, A., et al., "Fast DNA Amplification in Small Ultrathin-wall Microplates," *Bioorg Khim.*, 23(6):526-8, Jun. 1997.

Weis, J., et al., "Detection of Rare mRNAs via Quantitative RT-PCR," *Trends Genet.*, 8(8):263-4, Aug. 1992.

Wilding, P., et al., "PCR in a silicon microstructure," *Clin Chem.*, 40(9):1815-8, Sep. 1994.

Wittwer, C., et al., "Minimizing the Time Required for DNA Amplification by Efficient Heat Transfer to Small Samples," *Anal Biochem.*, 186(2):328-31, May 1, 1990.

Wittwer, C., et al., "Rapid Cycle DNA Amplification: Time and Temperature Optimization.," *Biotechniques*, 10(1):76-83, Jan. 1991.

RAPID THERMAL CYCLING DEVICE

FIELD OF THE INVENTION

This application is a continuation-in-part of U.S. patent application Ser. No. 10/041,703 entitled Rapid Thermal Cycling Device filed Jan. 8, 2002, and U.S. patent application Ser. No. 10/356,687 filed Jan. 31, 2003. The patent applications which are listed in the preceding sentence, including the specifications, figures and claims, are hereby incorporated by reference in their entirety as if fully set forth herein.

The invention of the present application addresses an apparatus and method for purifying ions in a liquid sample, particularly amplified DNA in the wells of a well plate.

BACKGROUND OF THE INVENTION

Nucleic acid amplification is typically performed by PCR or Cycle Sequencing of DNA in the wells of a well plate by thermal cycling reactions in the presence of a thermostable DNA polymerase such as Taq Polymerase. Well plates containing wells for 96, 384 and 1536 liquid samples currently are available. The solution in which the amplification occurs typically contains many different components including but not limited to, a buffer, nucleotide triphosphates, magnesium chloride, potassium chloride, dithiothreotol, DNA, oligonucleotides, and the DNA polymerase (e.g. Taq). Once the amplification process of the DNA is complete, the reaction solution contains not only the components listed above but reaction byproducts as well. The amplified nucleic acid must then be purified (segregated) from this mixture before additional steps can be performed. There are a number of methods by which DNA can be purified including size exclusion chromatography, gel electrophoresis, and ion exchange chromatography. Other typical methods to purify the DNA all are modifications of the above three methods. All of the currently available methods to purify the DNA products from solution require multiple additional steps and transfer of the product solution from the original reaction container into at least one additional container. It would be beneficial to be able to perform both nucleic acid amplification and purification in the same well of a well plate serially and without further additions to the well.

As used herein, the term "liquid" refers to pure liquids, as well as liquids containing particulate matter (especially biological material containing for example, proteins, DNA, or cells) and solvents containing solute.

In ion exchange chromatography, molecules of one charge (either positive or negative) are attracted to molecules of the opposite charge that are immobilized onto a solid support, usually a glass particle or insoluble organic support. The insoluble support material is then serial "washed" with solutions containing higher and higher concentrations of a specific salt (typically sodium chloride). As the salt concentration increases, the ions in the salt solution "compete" for the ion binding sites on the solid support with the result that at low salt concentrations, molecules with low net charge are competed from (released from) the solid support while molecules with higher net charges remain bound to the solid support.

Nucleic Acids, including Deoxyribonucleic Acid (DNA) and Ribonucleic Acid (RNA), are polymeric anions. As such, they will be attracted by insoluble supports that contain a positive charge (cathodes) and repelled by insoluble supports that contain a negative charge (anodes). Nucleic Acids have been successfully purified from heterogeneous solutions by ion exchange chromatography using various types of insoluble support materials. Typically, this is done through the addition of an ion exchange material into the solution containing the nucleic acid and manipulation of the ionic strength of the solution through the addition of small inorganic ions to allow binding of the nucleic acid to the insoluble support. Once binding of the nucleic acid to the insoluble support has occurred, the solution, and hence the "impurities", are removed from the soluble support by sequential "washing" of the support. By manipulating the ionic strength of the wash solution, some means of control over the size (length) of the nucleic acid polymer that remains attached to the support can be achieved. The ions in the wash solution compete for binding to the surface charge on the insoluble support with the nucleic acid and hence, the degree of nucleic acid binding can be crudely regulated by changing the concentration of ion in the wash solution. At a relatively low ionic strength (e.g. Distilled water) nucleic acid binding to the insoluble support is nearly independent of size. As the ionic strength of the wash solution increases, the shorter length nucleic acid polymers will elute from the support first, followed by longer polymers as the ionic strength of the wash solution increases.

One of the major problems with the current methods and devices for purification by ionic interaction is that the support materials have a fixed surface charge that cannot be changed. The support materials are usually described in terms of "weak," "moderate," or strong anion/cation exchange resins. Each of these "resins" is actually a different material with different physical properties. In order to change the surface charge, different materials are used as the support, or counter ions are used to effectively mask the charge.

SUMMARY OF THE INVENTION

Copending U.S. patent application Ser. No. 10/041,703 filed Jan. 8, 2002 and U.S. patent application Ser. 10/356,687 filed Jan. 31, 2003 teach generally the use of a lid for a well plate, for example a well plate having 1536 wells with each well having a volume of 6 μl. The lid has pins depending from the lid for insertion into the wells of a well plate. The pins extend from the upper side of the lid through the lid and into the wells of the well plate. The pins either contact the liquid samples in the wells or are in close physical proximity to the liquid sample without physically contacting the liquid sample. Heat may be supplied to or removed from the upper end of a pin to effect thermal cycling of the liquid sample. Sonic energy may be applied to the upper end of the pin to effect sonication (mechanical shearing) of the sample. An electrical charge may be applied to the upper end of the pin to segregate ions in the liquid sample.

The segregation of a material from a liquid sample in a well of a well plate by application of an electrical charge is referred to in this application as "electrical charge segregation." As used in this application, the term "pin" means any elongated member. As used in this application, a lid having pins depending from the lid, the pins being adapted to be inserted into the wells of a well plate, is referred to as a "pinned lid."

The present Invention provides for an improvement in electrical charge segregation of ions having different electrical charges in liquid samples contained in the wells of a well plate. A well plate is provided with a pinned lid. Each pin is a first electrode and is composed of, coated with, or includes on its surface a material that is capable of being electrically charged; that is, of containing a net electrical charge on its surface. An electrical charge, for example a positive electrical charge, is applied to a pin. In the improvement of the Invention, a second electrode is provided for each well of the well plate. To form the second electrode, each well of the well plate is composed of, coated with, or includes on its surface a material that is capable of being electrically charged. Alternatively, the second electrode is separate from the well, such as a second pin. Both the first and second electrodes are in contact with the liquid sample. Different electrical potentials are applied to the first and second electrodes.

Applying a difference in electrical potential between the first and second electrodes speeds the process of electrical charge segregation. Where a positive charge is applied to the pin, rendering the pin an anode, negatively charged ions (anions) in the liquid sample, such as the negatively-charged ions of amplified DNA resulting from PCR or Cycle Sequencing, will be attracted to and bound to the positively-charged pins. Positively charged ions (cations) in the liquid sample, such as the undesirable by-products of the amplification process, are repelled from the anode and are attracted to and bound to the negatively-charged second electrode (the cathode).

By varying the electrical potential between the cathode and the anode, molecules of differing net charge can be isolated. For example, a high net positive charge initially may be imparted to the pin (cathode) and a high net negative charge may be imparted to the second electrode (anode), resulting in a high electrical potential difference between the pin and second electrode. The high potential causes a majority of negatively-bound ions in the liquid sample to be attracted to and bound to the pin. The pin can then be removed from the liquid sample and placed into a second solution (water, buffer, etc.) and the net positive charge on the pin decreased. The result will be that molecules with a low net negative charge will be released into the second solution. This process can be repeated as necessary in order to segregate the desired molecules.

The present Invention also is an apparatus and method for selectively applying any of the steps of thermal cycling, sonication or electrical charge segregation in any sequence to a liquid sample contained in a well of a well plate.

BRIEF DESCRIPTION OF THE DRAWINGS

The accompanying drawings, which are incorporated in and form a part of the specification, illustrate the embodiments of the present invention and, together with the description, serve to explain the principles of the invention.

DETAILED DESCRIPTION OF AN EMBODIMENT

In describing an embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

A. The Pinned Lid and Well Plate.

Figure 1:
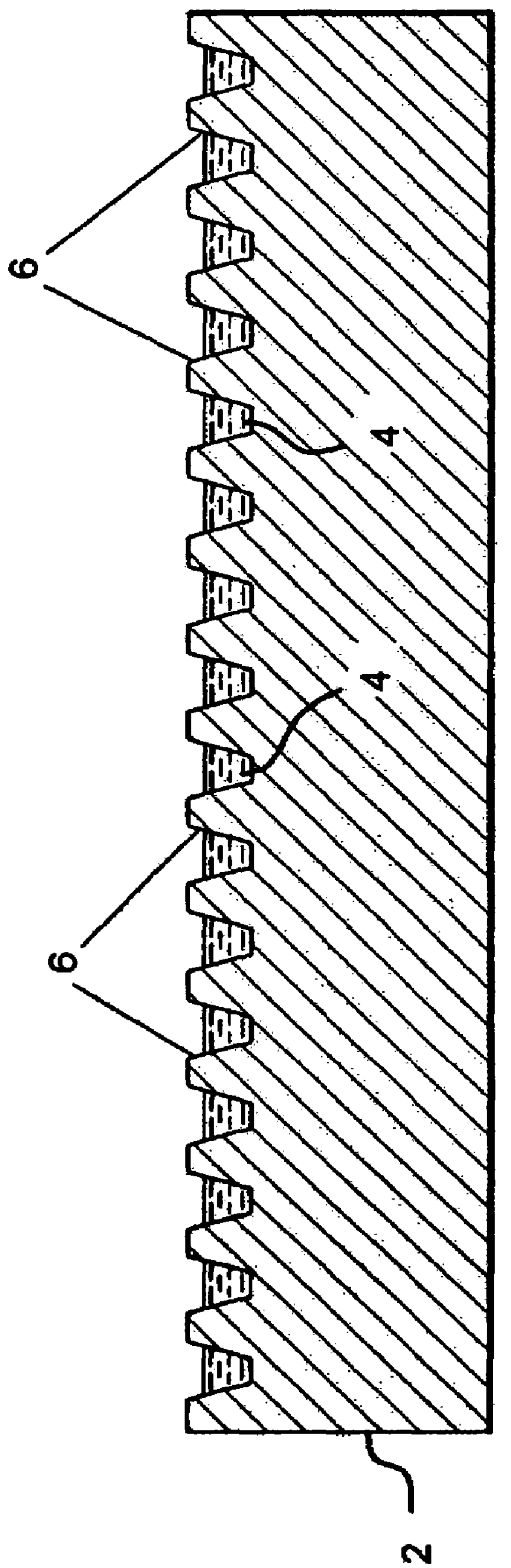
FIG. 1 is a well plate containing liquid samples
Figure 2:
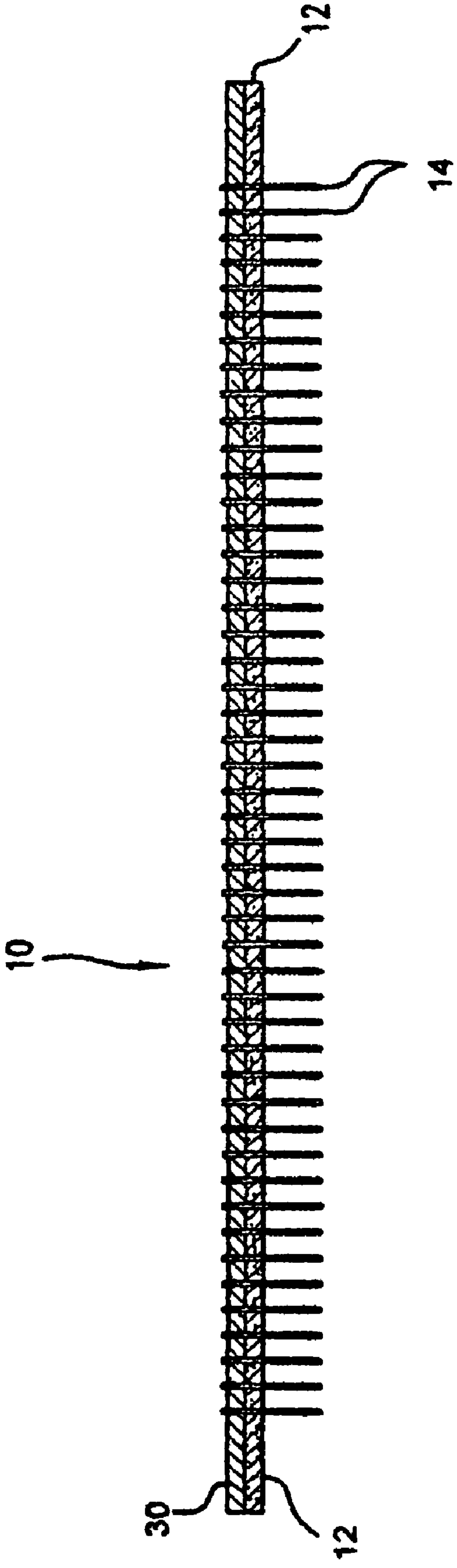
FIG. 2 is a pinned lid.

From FIGS. 1 through 4 and as shown by co-pending U.S. patent application Ser. No. 10/041,703 filed Jan. 8, 2002 and U.S. patent application Ser. 10/356,687 filed Jan. 31, 2003, the disclosures of the specification, claims and figures of which are incorporated by reference herein, a well plate 2 is a container for the simultaneous manipulation of numerous liquid samples 4 contained in wells 6. A pinned lid 10 as shown by FIG. 2 is provided for the well plate 2. The pinned lid 10 covers each of the wells 6 in the well plate 2 and serves to prevent evaporation of the liquid samples 4 or contamination of a liquid sample 4 by another liquid sample 4. The lid 10 may be composed of a circuit board material 12 or of any other sufficiently rigid material and may be injection molded. Pins 14 penetrate the lid 10. Each of the pins 14 has an upper end 16 and a lower end 18. The upper end 16 of a pin 14 penetrates the lid 10 through a hole 20 in the pinned lid 10.

Figure 3:
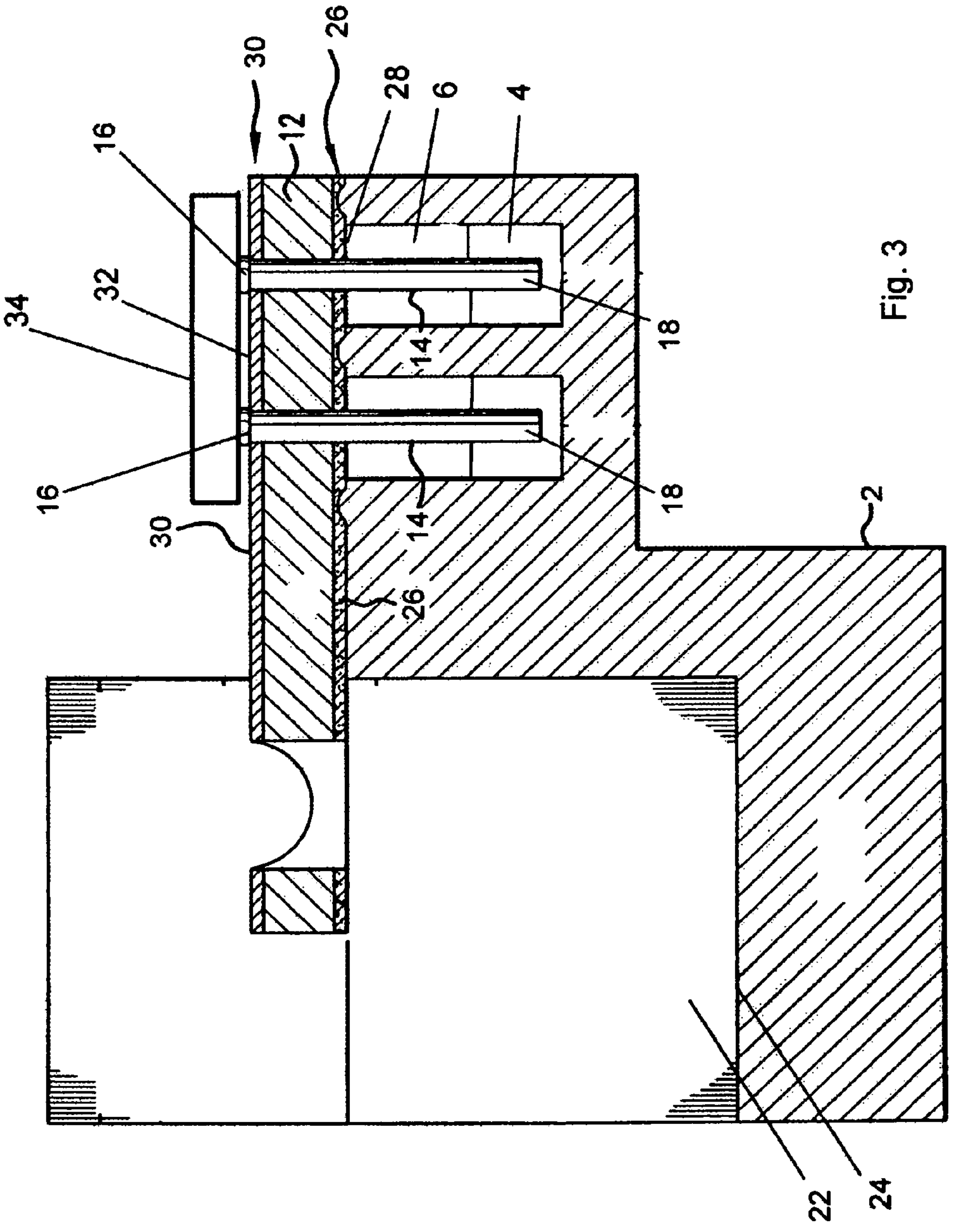
FIG. 3 is a detail sectional view of a pinned lid in place on a well plate.

As shown by FIG. 3, the lid 10 engages well-plate 2. Ears 22 on the lid 10 mate with slots 24 on the well plate 2 to accurately locate and guide the lid 10 so that the pins 14 do not touch the well plate 2 during installation or removal of the lid 10 from the well plate 2. Any other mechanism to adequately locate lid 10 with respect to well plate 2 may be used. When the lid 10 is installed on the well plate 2, each pin 14 projects into a well 6 of the well plate 2. A pin 14 may physically contact the liquid sample 4 contained in the well 6 into which the pin 14 is inserted.

A gasket 26 may be provided to seal the lid 10 against the wells 6 of the well plate 2, inhibiting evaporation of the liquid sample 4 during repeated heating and cooling of the sample 4 during thermal cycling. The gasket 26 is composed of a resilient material, such as silicone rubber. The gasket 26 may appear as a thin layer of resilient material applied to the lower side 28 of the lid 10. The gasket 26 also is useful in preventing microparticulate drops of liquid sample 4 from moving from one well 6 to an adjacent well 6 during sonication. The degree of sealing of the wells 6 required may vary with the application. Depending on the application, the lid 10 may be provided with a gasket 26 under the entire lid 10, a perimeter gasket 26 only, or no gasket 26 at all.

The upper end 16 of each pin 14 is supported by a resilient layer 30 located on the upper side 32 of the lid 10. The resilient layer 30 is composed of silicone rubber or any suitable resilient material. The pin 14 is able to ‘float’ on the resilient layer 30; namely, to move in the direction normal to the plane of the upper side 32 of the lid 10 in response to pressure applied to the pin 14 by, say, an electrical power supply 34, heating and cooling device 36 or sonic horn 38. Because each pin 14 is able to ‘float,’ minor differences in the height of the pins 14 above the upper side 32 of the lid 10 may be overcome by elastic deformation of the resilient layer 30 so that each pin 14 will contact the power supply 34, heating and cooling device 36 or sonic horn 38.

Figure 4:
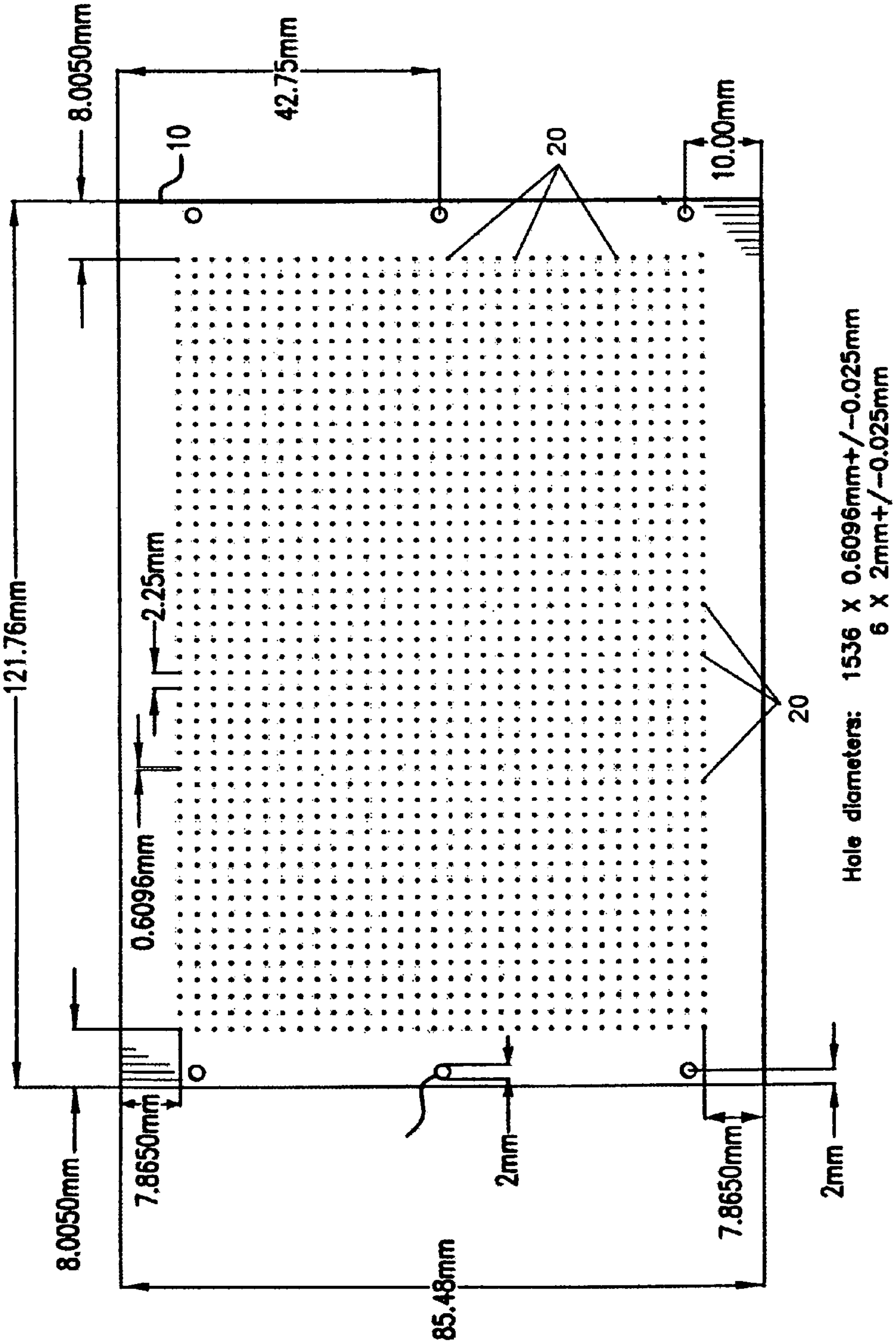
FIG. 4 is a plan view of a lid showing holes to receive pins.

As shown by FIG. 4, a plurality of holes 20, substantially the diameter or slightly greater in diameter than the pins 14 are drilled or molded into the lid 10 on a dimensional array corresponding to the dimensions of the well plate 2 that will be used. For example, for a well plate 2 having a 32 by 48 array of wells 6, the holes 20 would be drilled in a 32 by 48 array with a center to center spacing of 2.25 millimeters. The 1536 pins 14 are then inserted through the holes 20 such that the pins 14 protrude beyond the gasket 26. Based on the depth of a standard 1536-well plate 2, the pins 14 will protrude approximately 3 mm from the upper side 28 of the lid 10. The pins 14 may protrude from 3 mm for a well plate 2 having 1536 wells 6 to greater than 45 mm for a deep well plate 2 having 96 wells 6. If the pinned lid 10 will be used for sonication, the diameter of the holes 20 is selected so that the pin 14 will be able to vibrate in response to the sonic energy applied to the top of the pin 14, thereby sonicating the liquid sample 4.

The plurality of holes 20 and the number and location of pins 14 match the number and location of wells 6 in the well plate 2 for which the lid 10 will be used. For well plates 2 having 96 wells 6, the pattern of holes 20 and pins 14 is a regular array of 8×12 holes 20 and pins 14. For well plates 2 having 384 wells 6, the pattern of holes 20 and pins 14 is an array of 16×24 holes 20 and pins 14. For well plates 2 having 1536 wells 6, the pattern of holes 20 and pins 6 is an array of 32×48 holes 20 and pins 6.

B. Charge Segregation under the Co-Pending Applications.

As shown by co-pending U.S. patent application Ser, No. 10/041,703 filed Jan. 8, 2002 and U.S. patent application No. 10/356,687 filed Jan. 31, 2003, both of which are incorporated by reference herein, the pinned lid 10 may be used to purify material in a liquid sample 4 in a well 6 of a well plate 2. A positive or negative electrical charge may be placed on the surface of the pins 14 in a pinned lid 10. The electrical charge may be generated or transmitted by a conventional power supply 34, which may be a conventional DC power source or may be a conventional source of electrostatic charge. If a positive charge is applied to the pins 14 then the pins 14 attract negatively charged molecules in the liquid sample 4 in which the pins 14 are placed. The more negatively charged the molecule, the higher the binding affinity of the negatively charged molecule to the positively charged pin 14. The lid 10 and the pins 14 with negatively charged molecules bound to the pins 14 may then be removed from the original liquid sample 4 and placed in a new liquid sample 4 and the electrical charge on the pin 14 can be changed, thereby transfusing the molecules to the new liquid sample 4. In this way, negatively charged molecules can be removed from the original liquid sample 4 resulting in a purified liquid sample 4. The pin 14 initially may be given a negative charge and thus be used to purify positively charged molecules from the initial liquid sample 4.

A primary use of electrical charge segregation is purification of genetic materials after a nucleic acid amplification event. After completion of the step of thermal cycling of a suitable sample to amplify DNA in the sample, a very high positive charge density may be placed on a pin 14 of the pinned lid 10 by contacting the upper end 16 of the pin 14 with a source of positive electrical charge 34. The surface of the lower end 18 of the pin 14 also acquires a very high positive charge. Anions (including the nucleic acids to be "purified") rapidly bind to the surface of the pin 14. The charge density applied to the pin 14 then is decreased until molecules of only the desired charge (size) remain bound to the pin 14. The pinned lid 10 then is removed from the well plate 2, which removes the pin 14 from the liquid sample 4. The pinned lid 10 is placed on a second well plate 2, which immerses the bottom end 18 of the pin 14 into a second solution. The electrical charge on the pin 14 then is reversed such that the pin 14 becomes an anode containing a net negative charge. The negative charge on the pin 14 repels the negatively charged nucleic acid, and the nucleic acid is released and driven into the second solution and isolated from the reaction products.

As an alternative, when the pin 14 is placed into the second solution, the net positive surface charge may be decreased and not eliminated entirely. This decrease in the charge density of the pin 14 causes smaller nucleic acid fragments to be eluted from the pin 14. By gradually changing the surface charge, a serial purification of nucleic acid fragments based on their relative charge density (size) may be achieved.

The very high net negative charge of DNA amplified by the PCR reaction allows the DNA to be segregated and separated from the unused reactants, other products, and oligonucleotides in a single step. This technique also is used for the purification of proteins, DNA, RNA, or other molecules from 96, 384, 1536, or other well plate 2 formats. The net positive charge on the pin 14 can be precisely regulated by the user to control the binding of anions to the surface of the pin 14. Unlike conventional ion exchange resins that have a fixed net surface charge, the net surface charge on the pin 14 can be selected by the user. At a very high surface density of positive charge, many different anions will bind to the pin 14. As the surface density of positive charge is decreased, the more weakly bound anions will be released into solution. By varying the net surface density of positive charge, purification of the nucleic acid can be achieved. Very precise control of the surface charge will allow separation of nucleic acids that vary only slightly in their net charge (size).

C. Improved Charge Segregation of the Present Invention.

The improvement of the present Invention relates to electrical charge segregation. As illustrated schematically by FIG. 5, the speed and efficacy of electrical charge segregation of a liquid sample 4 in a well 6 of a well plate 2 is increased substantially where both a first electrode 40 and a second electrode 42 are provided. The first electrode 40 has a first electrode surface 44 that is in contact with the liquid sample 4. The second electrode 42 has a second electrode surface 46 that is also in contact with the liquid sample 4. A first electrical potential is applied to the first electrode surface 44, causing the first electrode surface 44 to exhibit a first electrical charge (indicated by "+" symbols on FIG. 5) to the liquid sample 4. A second electrical potential is applied to the second electrode surface 46, causing the second electrode surface 46 to exhibit a second electrical charge (indicated by "–" symbols on FIG. 5) to the liquid sample 4.

The first and second electrical potentials may be supplied by a conventional power supply 34 or source of electrostatic charge. The difference between the first and second electrical potentials defines a voltage between the first and second electrodes 40, 42. The voltage creates a small flow of electrical current between the first and second electrodes 40, 42 and generates an electrical field in the vicinity of the first and second electrodes 40, 42. The first and second electrical potentials are selected to appropriately attract or repel ions in the liquid sample 4, as desired.

If, for example, a positive electrical potential is applied to the first electrode 40, the first electrode 40 is an anode and a positive electrical charge is exhibited to the liquid sample 4 by the first electrode (anode) surface 44. The first electrode 40 will attract negatively charged ions (anions) 48 in the liquid sample 4, such as ions of amplified DNA. The anions 48 of DNA will bind to the first electrode 40. If a negative electrical potential is applied to the second electrode 42, the second electrode 42 is a cathode and a negative electrical charge is exhibited to the liquid sample 4 by the second electrode (cathode) surface 46. The second electrode 42 will attract positively charged ions (cations) 50 in the liquid sample 4, such as ions of the undesirable byproducts of the DNA amplification process. The cations 50 will bind to the second electrode 42.

A pre-selected voltage is applied to the first and second electrodes 40, 42 for a predetermined period of time, effecting electrical charge segregation. The voltage applied between the first and the second electrode 40, 42 will determine the rate at which ions migrate to their respective electrodes. Voltages from 0.001 to 1000 volts can be applied. The preferred voltage is in the range of 1-20 volts DC as this allows for purification of the desired DNA in solution within a reasonable period of time.

Figure 5:
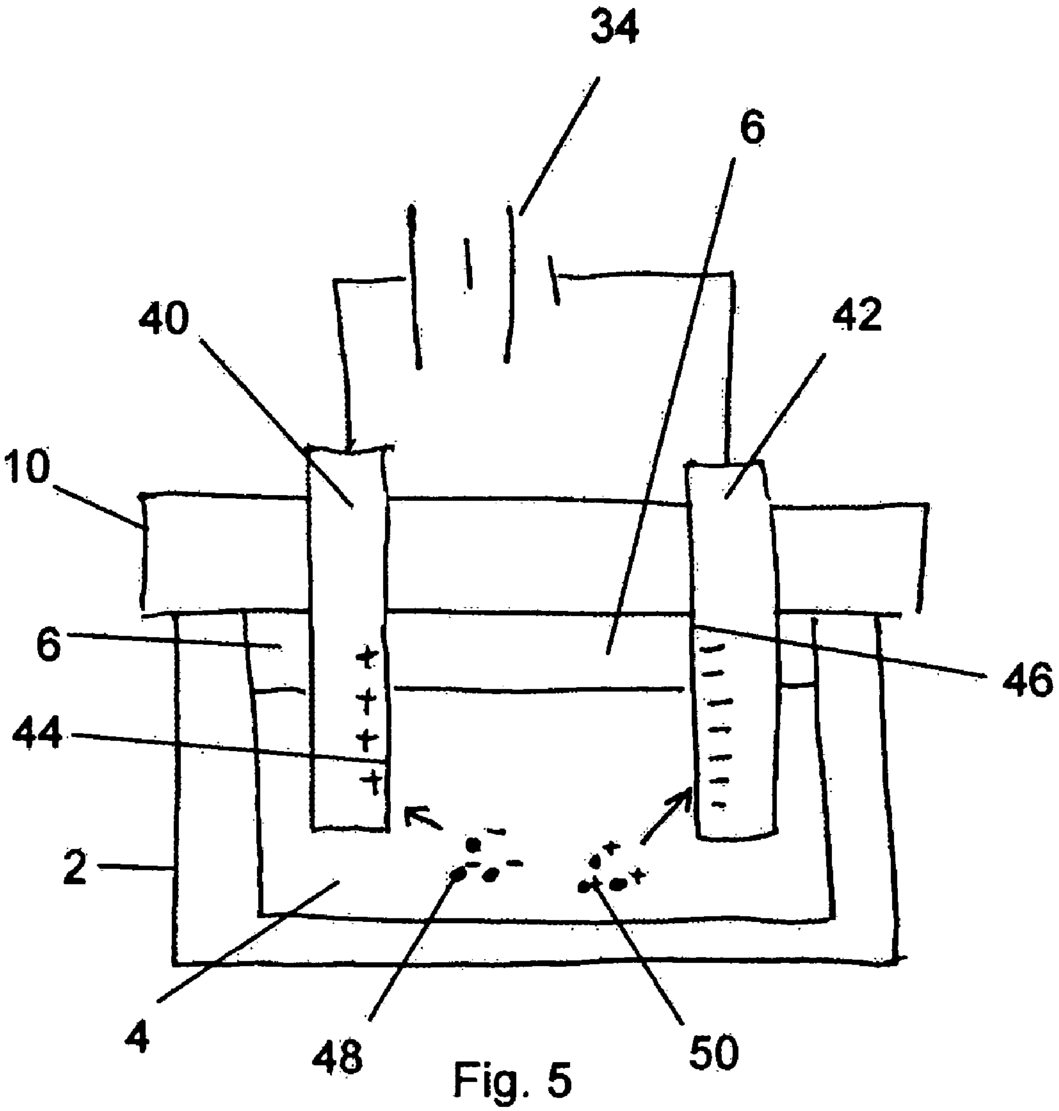
FIG. 5 is a schematic view of the apparatus.

In the example shown by FIG. 5, the desired ions, anions of DNA 48, bind to the first electrode in response to the applied voltage. The voltage is then removed and the first electrode 40 is withdrawn from the well plate 2. The amplified DNA anions 48 or other desired ions adhere to the first electrode 40. The first electrode 40 is placed in a second well 6 of a second well plate 2 and the first electrode 40 is extended into a second well 6 containing a bath comprising a second liquid sample 4 including a suitable solvent. The now-purified DNA anions 48 are released from the second electrode 42 and dissolved in the second liquid sample 4. Alternatively, a charge of reversed polarity can be applied to the second electrode 42 or a voltage difference of reversed polarity can be applied between the first electrode 40 (with the desired ions bound to the first electrode 40) and a second electrode 42 associated with the second well 6, repelling the desired ions from the first electrode 40 and attracting the desired ions toward the second electrode 42.

The efficacy of the use of two electrodes 40, 42 for electrical charge segregation has been verified by experiment. In the experiment, both the anode 40 and cathode 42 in a well 6 of a well plate 2 were pins 14. Samples of DNA anions 48 were exposed to DC voltage differences between the cathode 42 and anode 40 ranging from 0.5 volts to 4.7 volts over a period of 20 minutes. At the end of 20 minutes, each anode 40 was placed in a second well 6 of a well plate 2 and allowed to incubate for 5 minutes. Gel electrophoresis was performed on each resulting second liquid sample 4 from the second well plate 2 and compared to electrophoresis of a control and to molecular weight standards. The gel electrophoresis revealed that purification of the DNA was completed in the liquid samples 4 exposed to 3.5 volts or greater for a period of 20 minutes.

Figure 6:
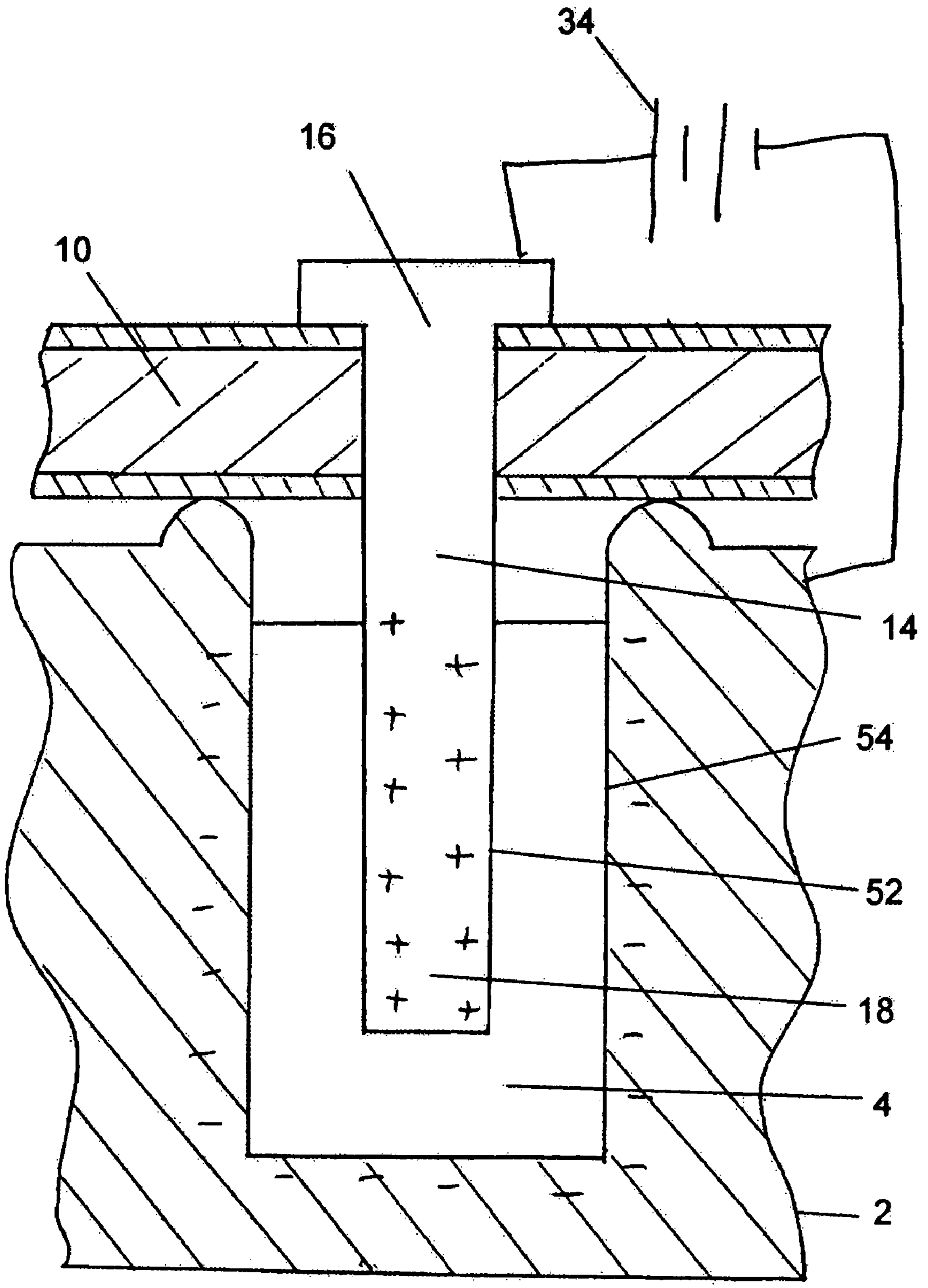
FIG. 6 is a detail cross section of a well and pin with the well plate as second electrode.

As shown by FIG. 6 a pin 14 of a pinned lid 10 may be the first electrode 40. The pin 14 is composed of any conductive material that will accept an electrical charge applied to the upper end 16 of the pin 14, transmit that electrical charge to the lower end 18 of the pin 14 and exhibit the electrical charge (shown by "+" symbols on FIG. 6) to the liquid sample 4 in the well 6 of the well plate 2. For purposes of this application, the terms "conducting" or "conductive" as applied to a material means that the material has adequate electrical conductivity to transfer sufficient electrical charge to effect charge segregation. The term "conductor" means any material that is conducting as herein defined. The term "non-conducting" or "non-conductive" means any other material.

The pin 14 may be composed of a conductive metal, plastic, carbon or any other conductive material. The conductive material may be applied, deposited or formed as a film, coating or other element to an otherwise non-conductive pin 14; alternatively, the conductive material may have any other configuration adequate to transmit a sufficient electrical charge from the upper end to the lower end of the pin. As used in this application, the term "coating" means any thin layer of material.

Many configurations are suitable for the second electrode 42. Several of those configurations are illustrated by FIGS. 6–14. In each of the configurations, the pin 14 functions as the first electrode 40. The positive terminal of power supply 34 is electrically connected to the upper end 16 of pin. Pin 14 passes through lid 10 and penetrates the interior of well 6 in well plate 2. Pin 14 has a pin surface 52 that is the first electrode surface 44 and is in contact with liquid sample 4. The pin 14 exhibits on the pin surface 52 a positive electrical charge, thereby exposing the liquid sample 4 to a positive electrical charge.

As shown by FIG. 6, the entire well plate 2 may comprise the second electrode 42. The negative terminal of power supply 34 is electrically connected to the well plate 2. The well plate 2 is composed of a conductive material. The well plate 2 conveys a negative electrical charge to the interior surface 54 of well 6 so that the interior surface 54 exhibits a sufficient negative charge (shown by "–" symbols on FIG. 6) to effect charge segregation in combination with the positive charge exhibited by pin surface 52.

Figure 7:
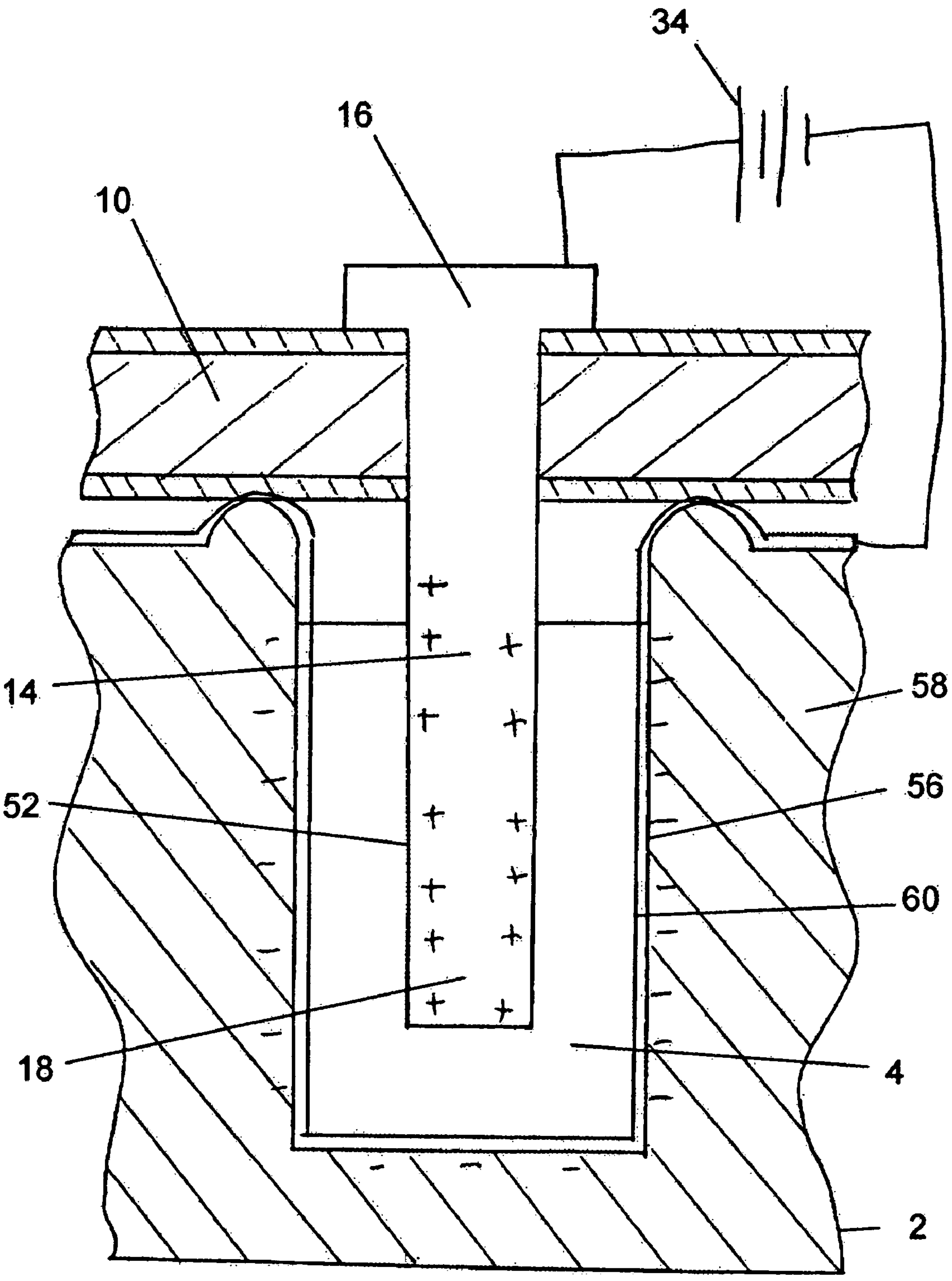
FIG. 7 is a detail cross section of a well and pin, with a coating as a second electrode.

As shown by FIG. 7, the second electrode 42 may be a conductive coating 56 applied or deposited on a substrate 58, the coating 56 and substrate 58 together defining the well 6 of the well plate 2. The negative terminal of the power supply 34 is electrically connected to the coating 56. The coating 56 defines a second electrode surface portion 60 of the interior of well 6 and exposes the liquid sample 4 to the negative electrical charge, which in combination with the positive charge exhibited by the pin surface 52, effects electrical charge segregation.

Figure 8:
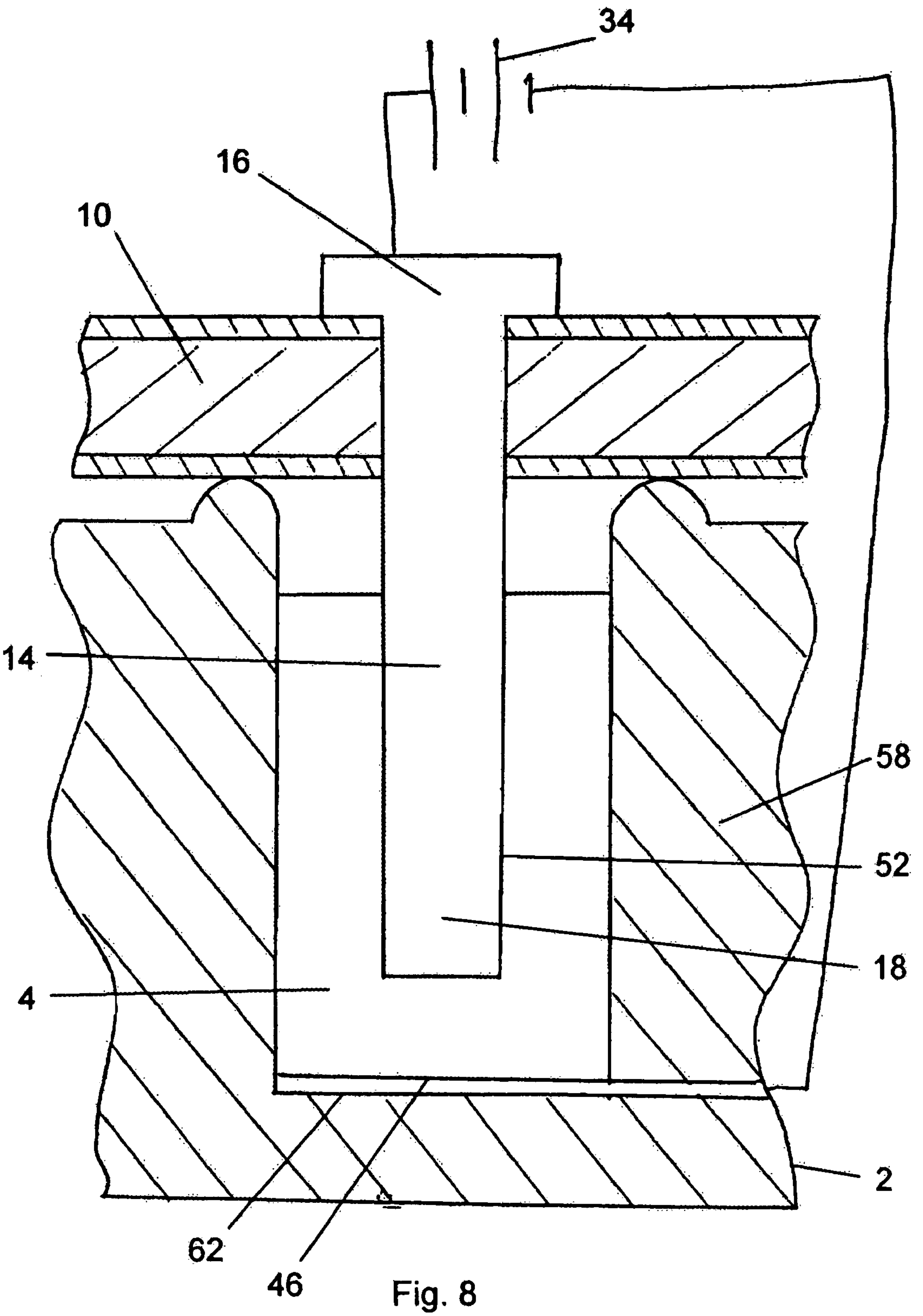
FIG. 8 is a detail cross section of a well and pin, with a wire or wire film as the second electrode.
Figure 9:
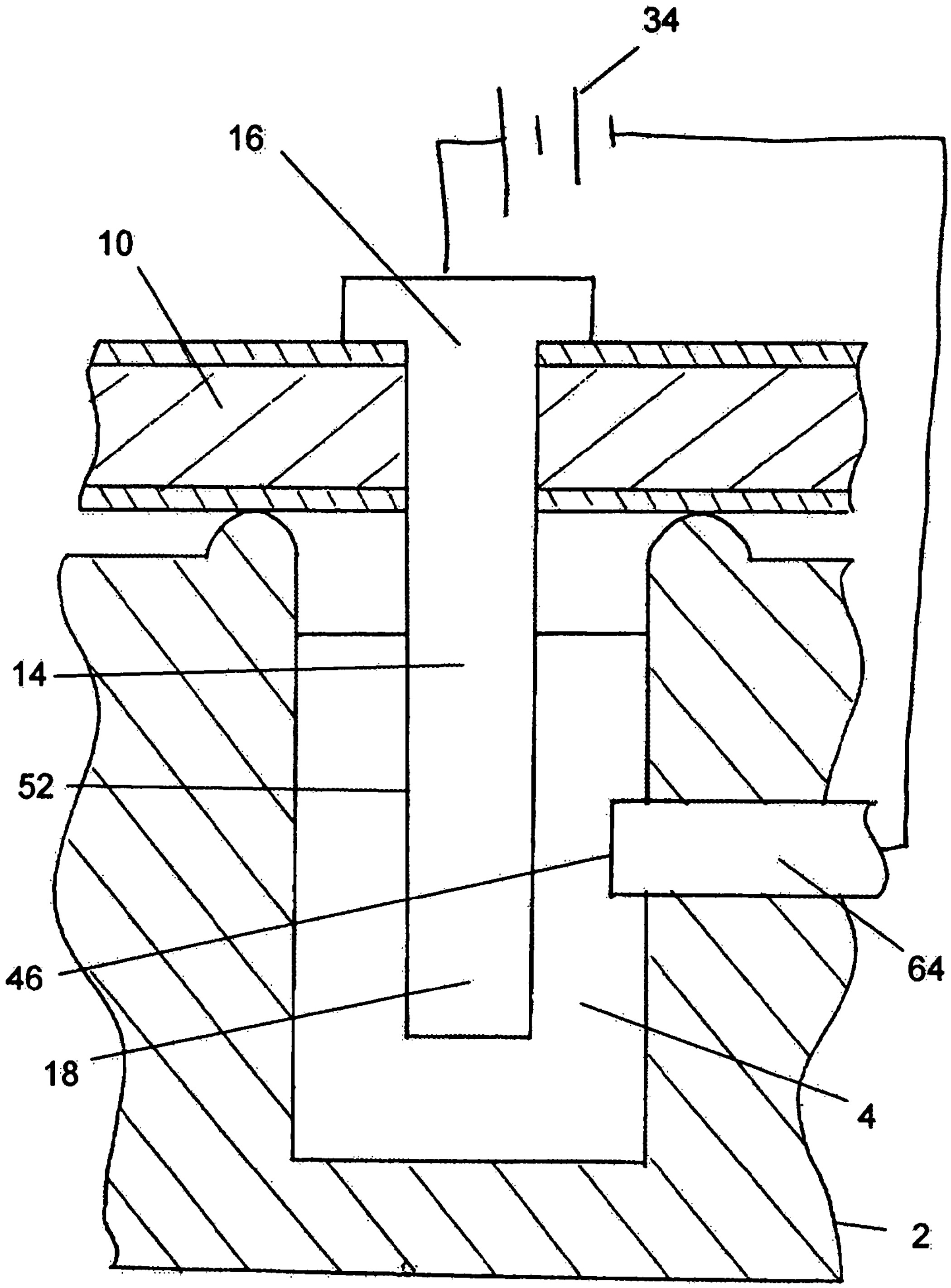
FIG. 9 is a detail cross section of a well and pin, with a second pin or rod molded into the well plate as the second electrode.
Figure 10:
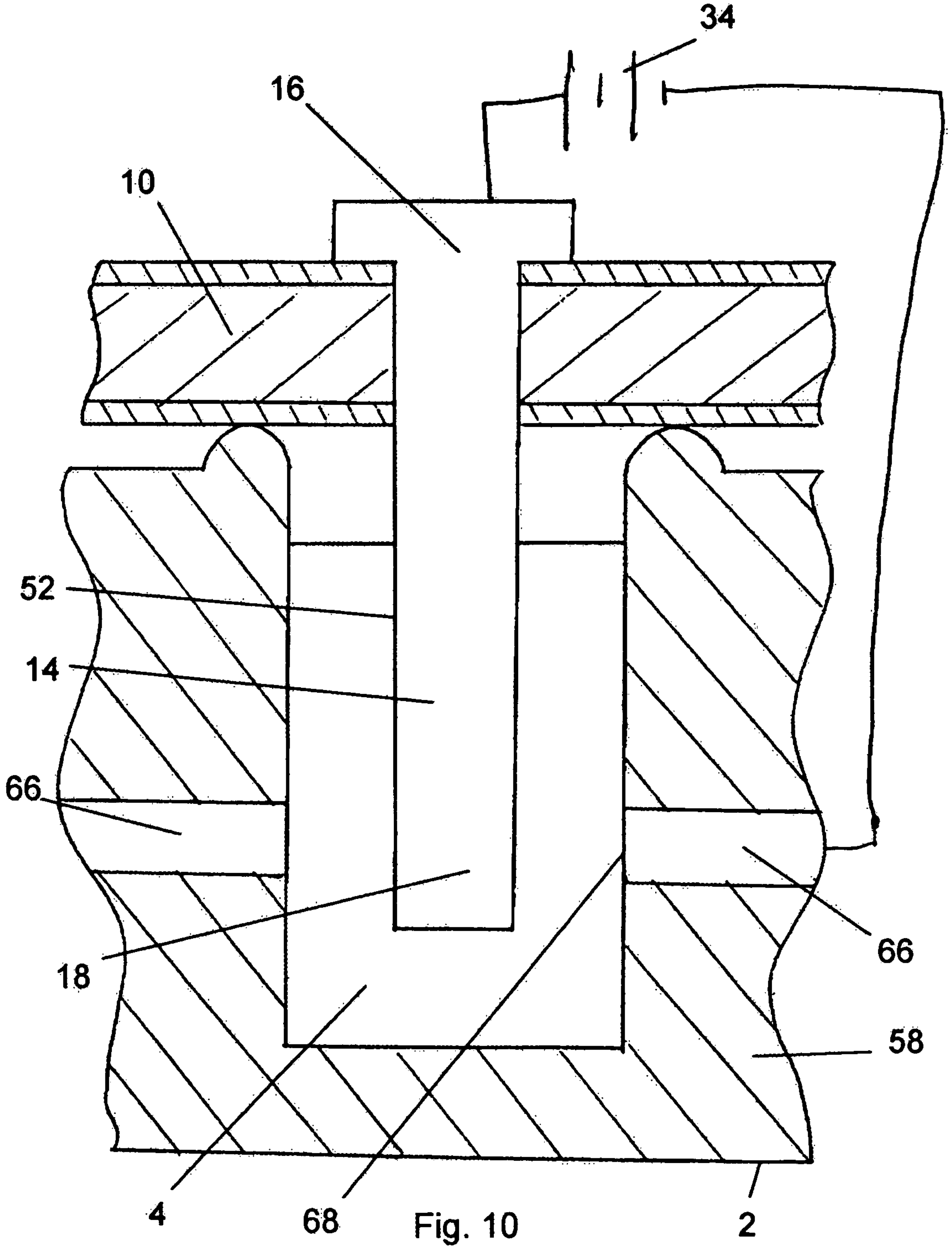
FIG. 10 is a detail cross section of a well and pin, with a conducting layer molded into the well plate as the second electrode.

The second electrode 42 may be a conducting material incorporated into the structure of the well plate 2, as shown by FIGS. 8–10. FIG. 8 shows the second electrode 42 as a wire or wire film (a thin strip of metal) 62 formed as a part of the structure of the well plate 2. For example, a substrate 58 can be molded around wire or wire film 62 to form the well plate 2. The surface of the wire or wire film 62 exposed to the liquid sample 4 becomes the second electrode surface 46. The negative terminal of the power supply 34 is attached to the wire or wire film 62. The surface of the wire or wire film 62 exposes the liquid sample 4 to the negatively charge, which in combination with the positive charge exhibited by the pin surface 52 effects electrical charge segregation.

FIG. 9 shows the second electrode 42 as a rod 64 installed in the well plate 2. The negative terminal of the power supply 34 is attached to the rod 64. The surface of the rod 64 is the second electrode surface 46 and exposes the liquid sample 4 to a negative electrical charge, which in combination with the positive charge exhibited by the pin surface 52 effects electrical charge segregation.

FIG. 10 shows a second electrode 42 as a layer 66 of conducting material cast, molded or otherwise formed in an otherwise non-conducting well plate 2. An example of the embodiment illustrated by FIG. 10 would be a layer of conducting plastic molded between layers of non-conducting plastic to form the well plate 2. The layer surface 68 in the well 6 becomes the second electrode surface 46. The negative terminal of the power supply 34 is connected to the conducting layer 66. The layer surface 68 exposes the liquid sample 4 to a negative electrical charge, which in combination with the positive charge exhibited by the pin surface 52 effects electrical charge segregation.

Figure 11:
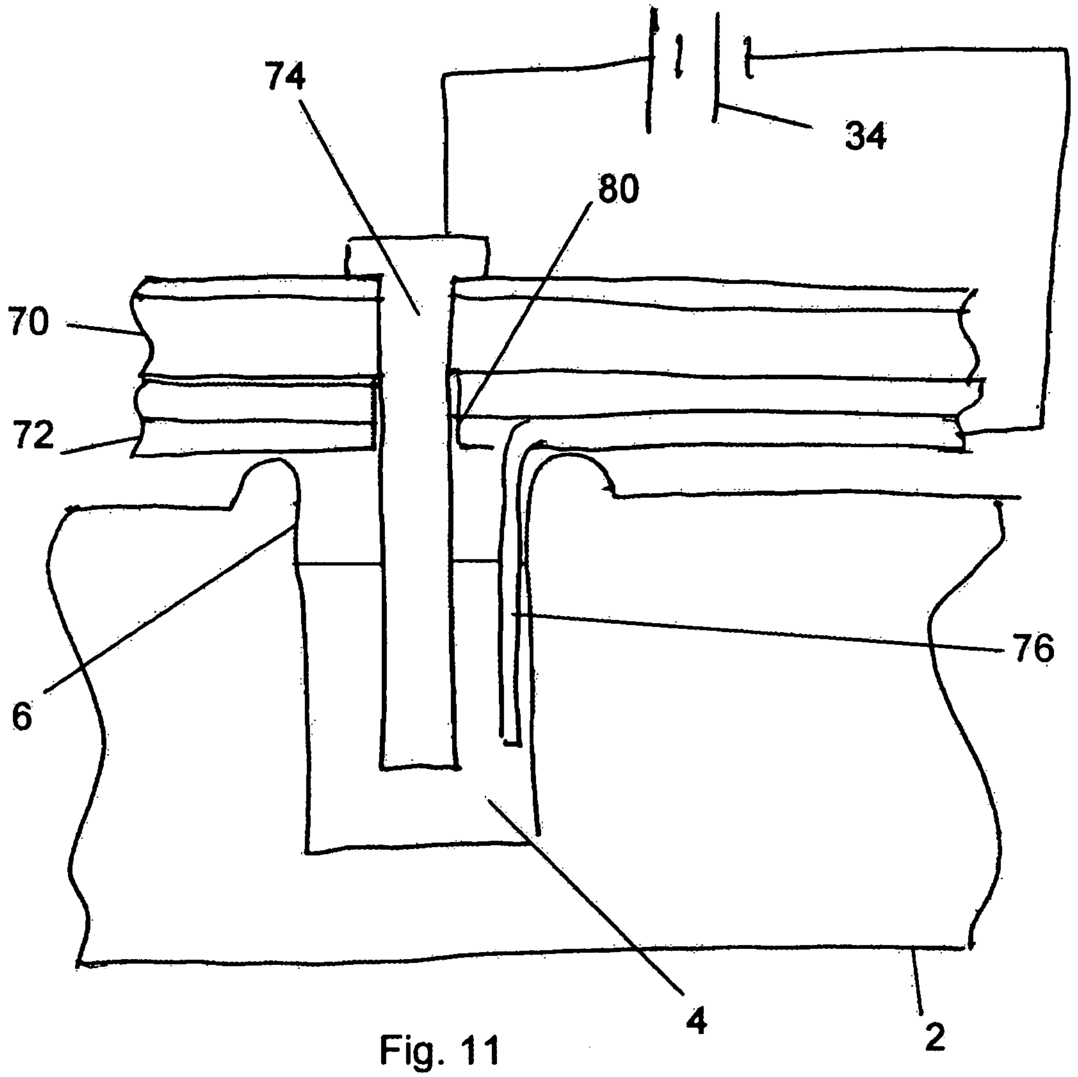
FIG. 11 is a detail cross section of the apparatus with a second pin depending from a second lid as the second electrode.
Figure 12:
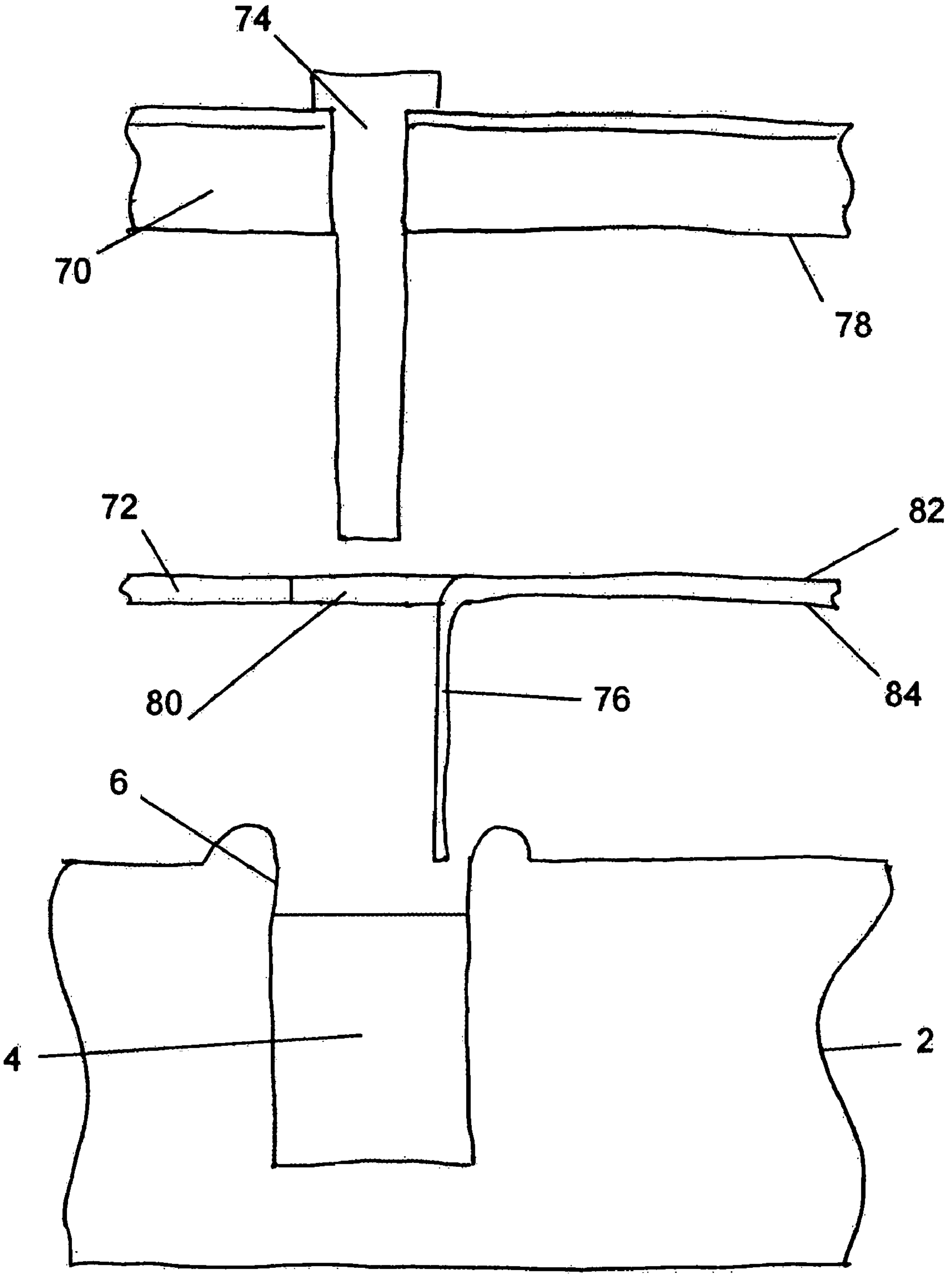
FIG. 12 is a exploded cross section of a well and pin, with the second pin depending from the second lid as the second electrode.

FIGS. 11 and 12 show a first lid 70 and a second lid 72. The first electrode 40 is a first pin 74 depending from the lower side 78 of first lid 70 and passing through an opening 80 in the second lid 72. The second electrode 42 is a second pin 76 depending from the second lid 72. The upper side 82 of second lid 72 engages the lower side 78 of first lid 70. The lower side 84 of second lid 72 engages the well plate 2. The second lid 72 may be rigid or flexible and may double in function as the gasket 26 preventing evaporation of the liquid sample 4 or cross contamination among wells 6.

As illustrated in FIG. 11 and in exploded view 12, the second lid 72 is composed of a conducting material and the second lid 72 is cut or molded to form the second pin 76. The first pin 74 is electrically connected to the positive terminal of the power supply 34, which imparts a positive electrical charge to the surface of first pin 74. Second pin 76 is electrically connected to the negative terminal of power supply 34, which imparts a negative charge to the surface of second pin 76. The negative charge exhibited by the second pin 76 and the positive charge exhibited by the first pin 74 effect electrical charge segregation.

Figure 13:
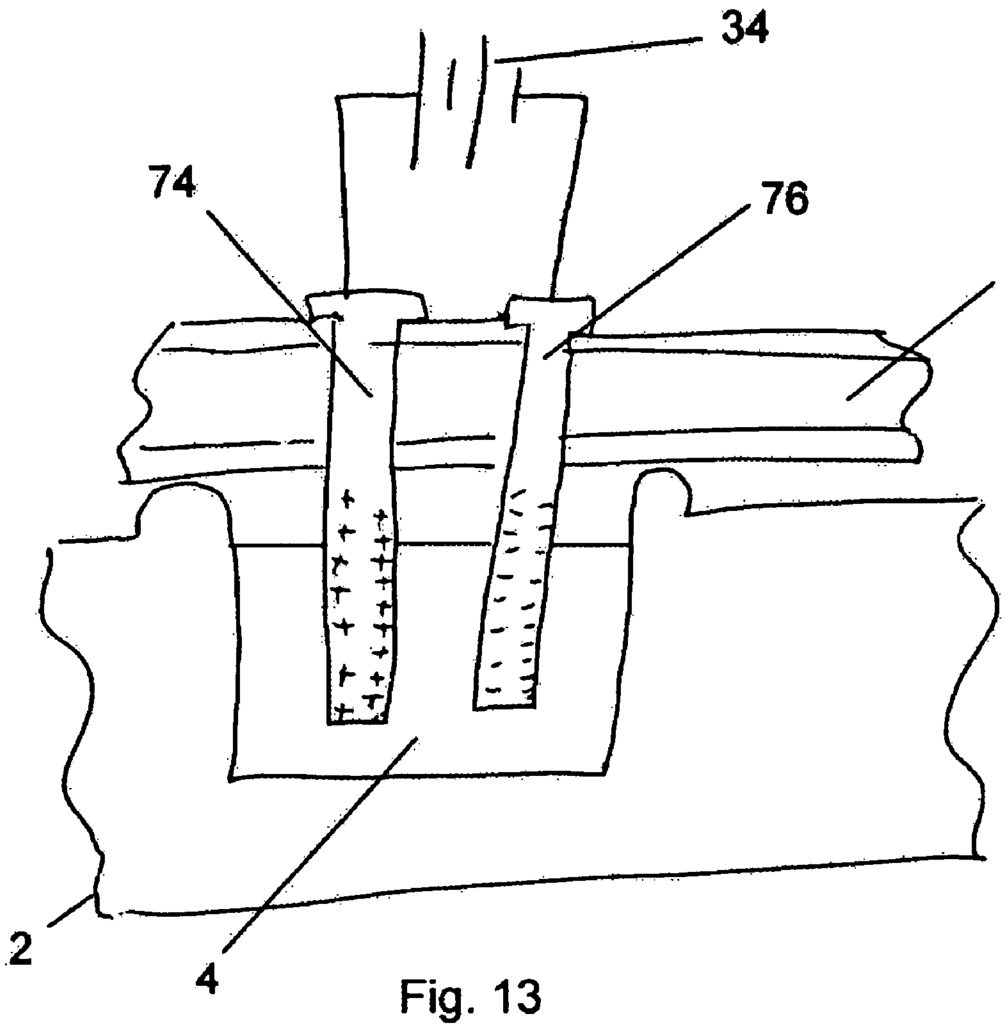
FIG. 13 is a detail cross section of two pins depending from one lid.
Figure 14:
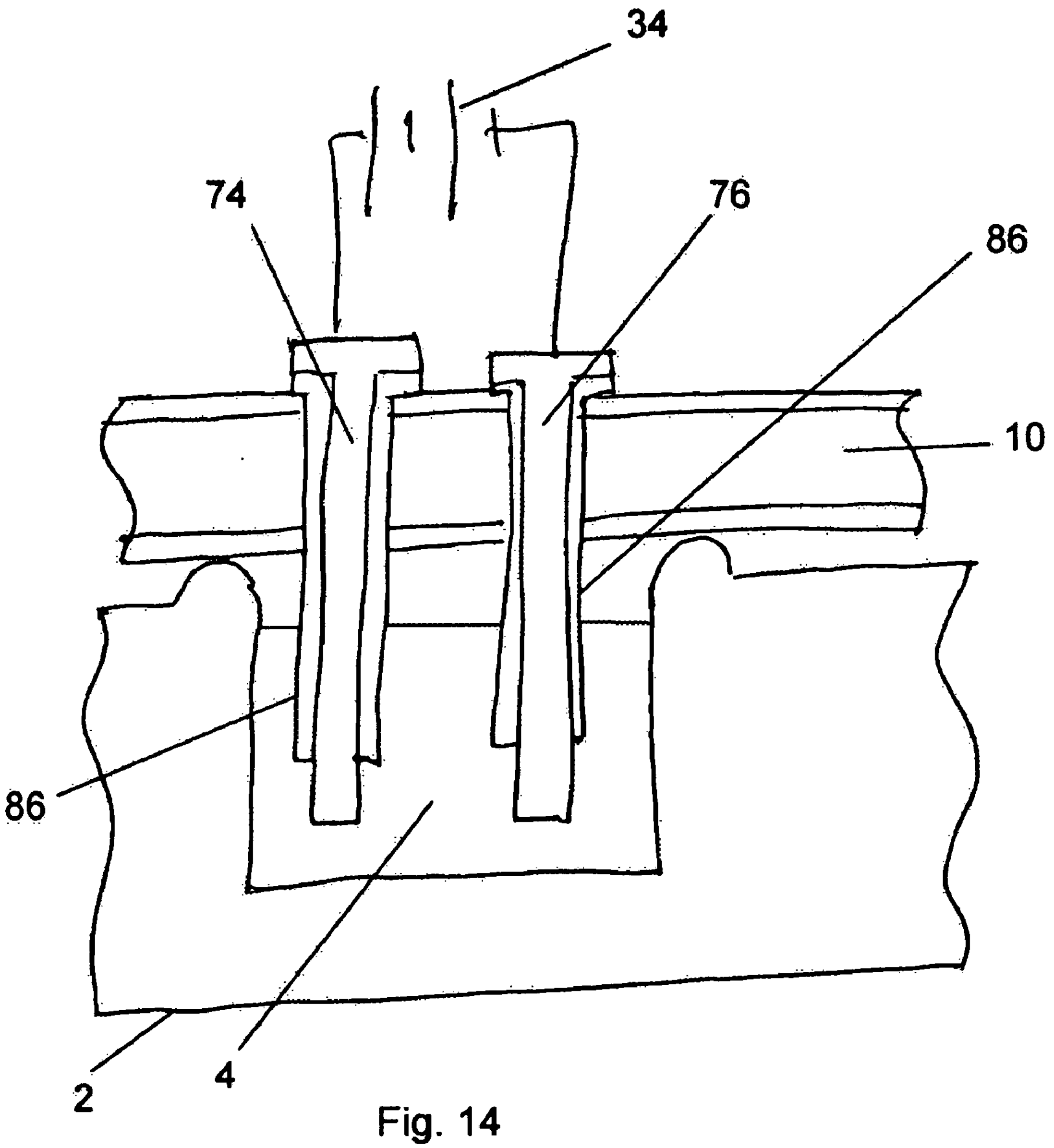
FIG. 14 is a detail cross section showing overmolded pins.

FIGS. 13 and 14 show additional configurations in which the first electrode 40 is a first pin 74 and the second electrode 42 is a second pin 76. Both first and second pins 74, 76 depend from a single pinned lid 10. FIG. 14 illustrates an over-molded construction 86 for the first and second pins 74, 76. In an over-molded construction 86, a moldable material such as a polymer is molded around a pin 14, 74, 76, reinforcing and electrically insulating the pin 14, 74, 76. The electrical power supply 34 is connected between first and second pins 74, 76 transmitting a positive charge to the first electrode surface 44 of first pin 74 and a negative charge to the second electrode surface 46 of second pin 76, effecting electrical charge segregation of the liquid sample 4.

Figure 15:
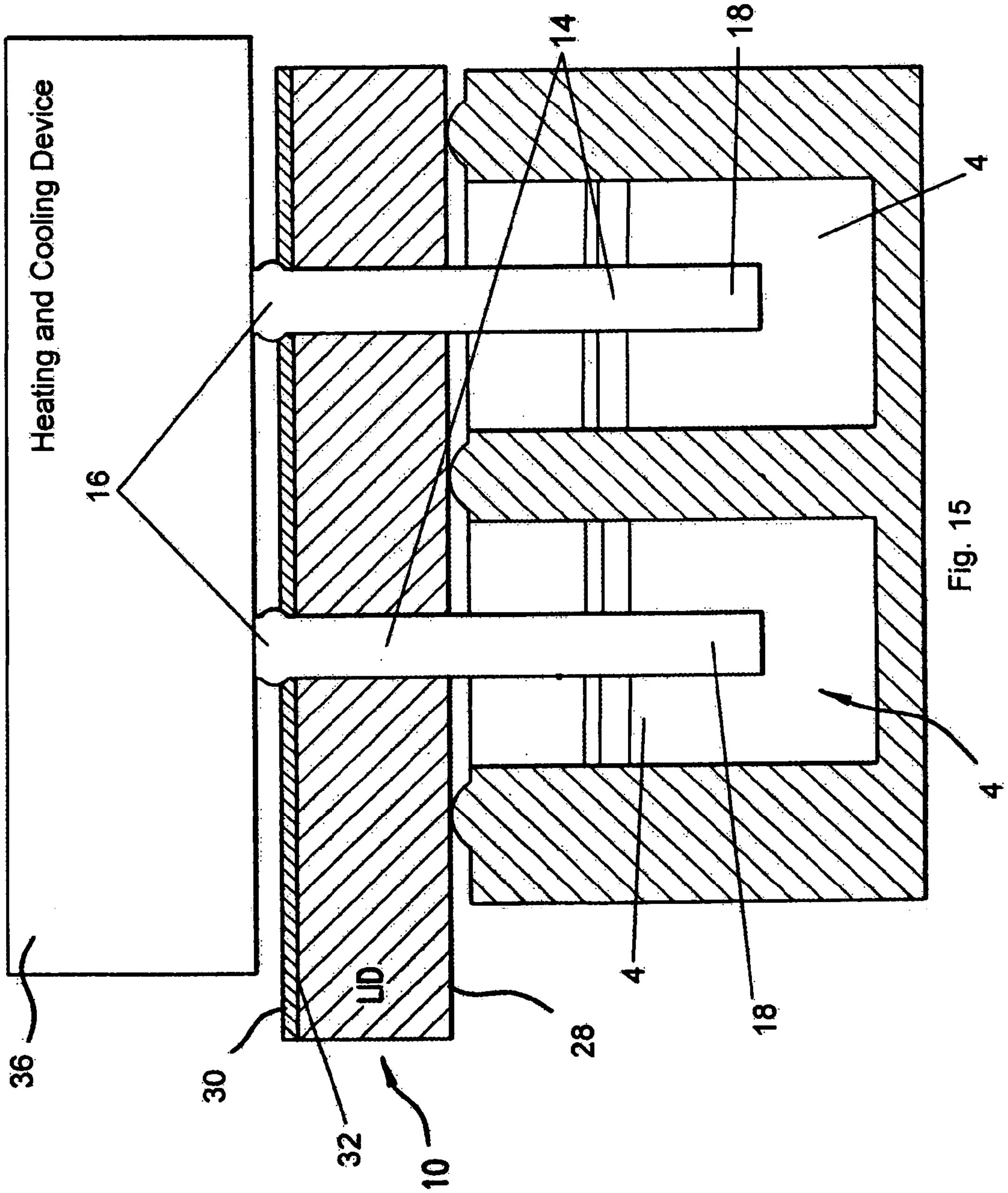
FIG. 15 is a detail cross section showing the apparatus adapted for thermal cycling.

The pinned lid 10 of the present Invention may be utilized for the functions of thermal cycling and sonication in addition to electrical charge segregation, as described in U.S. patent application Ser. No. 10/041,703 filed Jan. 8, 2002 and U.S. patent application Ser. No. 10/356,687 filed Jan. 31, 2003, both of which are incorporated by reference as if set forth in full herein. To effect thermal cycling and as shown by FIG. 15, pins 14 in the pinned lid 10 are constructed of a material, such as a brass, having an adequate thermal conductivity to allow thermal cycling of a liquid sample 4 by application of or removal of heat from the upper portion 16 of the pin 14. The temperatures of the upper ends 16 of the pins 14 are selectably adjusted by using a conventional heating or cooling device 36, such as: a peltier device applied to the upper end 16 of pin 14; a heated or cooled stream of air directed over the upper end 16 of the pins 14; or a conventional heat/cold block applied to the upper end 16 of the pins 14. Heat is transmitted the length of the pin 14 and transferred to or from the liquid sample 4, controlling the temperature of the liquid sample 4. The lower end 18 of the pin 14 may be immersed in the liquid sample 4 for thermal cycling, or the lower end 18 of the pin 14 may be in close proximity to the liquid sample 4.

Figure 16:
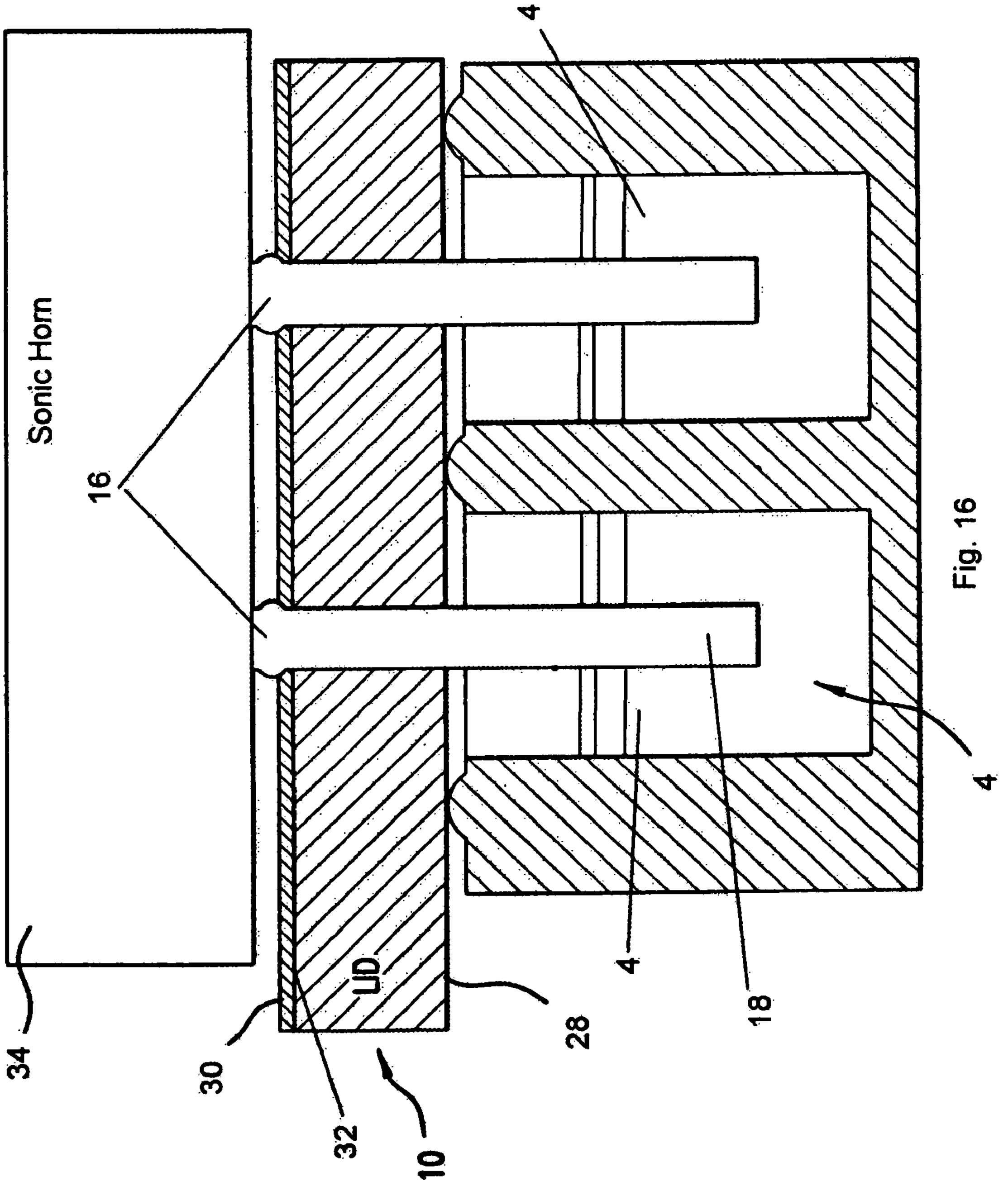
FIG. 16 is a detail cross section showing the apparatus adapted for sonication.

As shown by FIG. 16, the pinned lid 10 may be used selectably to transfer sonic energy to, or "sonicate," a liquid sample 4. The primary uses of sonication using the pinned lid 10 are to shear large molecules such as nucleic acids or proteins into smaller molecules or to disrupt bacteria, fungal, mammalian or other cells, thereby releasing the contents of the cells into the liquid sample 4. Sonication through use of the pinned lid 10 can also be used to help solubilize particulate matter such as small organic or inorganic molecules or to promote a chemical reaction. To sonicate a liquid sample 4 in the well 6 of a well plate 2, a conventional sonic horn 38 or other such conventional device is brought into physical contact with the upper end 16 of the pin 14, the lower end 18 of which is immersed in a liquid sample 4. The sonic horn 38 is energized, generating sonic energy. The sonic energy from the horn 38 is transferred to the pin 14 in the lid 10, causing the pin 14 to vibrate ultrasonically. The vibrating pin 14 sonicates the liquid sample 4. Any or all of Sonication, thermal cycling and electrical charge segregation may be applied in any order and may be applied on multiple occasions to a sample.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

What is claimed is

1. An apparatus for electrical charge segregation of a liquid sample, the apparatus comprising:

a. a well plate;

b. a well defined by said well plate, said well plate adapted to contain the sample;

c. a first electrode, said first electrode having a first electrode surface, said first electrode surface being adapted to contact the liquid sample within said well, said first electrode surface being adapted to exhibit a first electrical charge to the liquid sample in response to a first electrical potential applied to said first electrode;

c. a second electrode, said second electrode having a second electrode surface, said second electrode surface being adapted to contact the liquid sample within said well, said second electrode surface being adapted to exhibit a second electrical charge to the liquid sample in response to a second electrical potential applied to said second electrode.

2. The apparatus of claim 1, further comprising:

a. a lid having an upper side and a lower side, said lower side of said lid being adapted to engage said well plate;

b. a pin, said pin having an upper end and a lower end, said lower end of said pin being adapted to depend from said lower side of said lid into said well, said pin having a pin surface, said pin surface defining said first electrode surface .

3. The apparatus of claim 2 wherein said pin penetrates said lid, said upper end of said pin extending through said upper side of said lid.

4. The apparatus of claim 3, further comprising: a power supply, said power supply being electrically connected to said first electrode and said second electrode, said power supply being adapted to apply said first electrical potential to said first electrode, said power supply being adapted to apply said second potential to said second electrode.

5. The apparatus of claim 4 wherein said first electrical potential is of an opposite polarity to said second electrical potential.

6. The apparatus of claim 5 wherein said well has an interior surface, said interior surface of said well defining said second electrode surface.

7. The apparatus of claim 6 wherein said well plate defines said second electrode, said well plate having an electrical conductance, said electrical conductance of said well plate being pre-selected to allow said well plate effectively to transmit said second electrical potential to said interior surface of said well and to exhibit said second electrical charge to said liquid sample.

8. The apparatus of claim 7, said well plate comprising: a resin, a metal or a carbon.

9. The apparatus of claim 6, further comprising: a coating, said coating defining said second electrode surface, said coating having an electrical conductance, said electrical conductance of said coating being pre-selected to allow said coating effectively to transmit said second electrical potential and to exhibit said second electrical charge to said liquid sample.

10. The apparatus of claim 9, further comprising: a substrate, said substrate underlying said coating, said coating and said substrate in combination defining said second electrode.

11. The apparatus of claim 10 wherein said coating and said substrate in combination define said well plate.

12. The apparatus of claim 11, said coating comprising: a resin, a metal or a carbon.

13. The apparatus of claim 5, further comprising:

a. a conductor, said conductor having an electrical conductance, said electrical conductance of said conductor being pre-selected to allow said conductor effectively to transmit said second electrical potential and to exhibit said second electrical charge to said liquid sample, said conductor defining said second electrode surface;

b. a substrate adapted to incorporate said conductor.

14. The apparatus of claim 13, said adaptation of said substrate to incorporate said conductor comprising: said substrate being molded or otherwise formed around said conductor, or said substrate comprising said conductor.

15. The apparatus of claim 14, said conductor comprising: a wire, wire film, rod or resin.

16. The apparatus of claim 5 wherein said pin is a first pin, the apparatus further comprising: a second pin, said second pin having an upper end and a lower end, said upper end of said second pin penetrating said upper side of said lid, said lower end of said second pin extending through said lid into said well, said second pin having a second pin surface, said second pin surface defining said second electrode surface.

17. The apparatus of claim 5 wherein said pin is of an overmolded construction.

18. The apparatus of claim 1, further comprising:

a. a first lid, said first lid having an upper side and a lower side;

b. a first pin, said first pin having an upper end and a lower end, said lower end of said first pin being adapted to depend from said lower side of said first lid into said well and to contact the liquid sample, said upper end of said first pin being adapted to penetrate said upper side of said first lid, said first pin defining said first electrode;

c. a second lid, said second lid having an upper side and a lower side, said lower side of said second lid engaging said well plate, said upper side of said second lid engaging said lower side of said first lid;

b. a second pin, said second pin depending from said second lid into said well, said second pin adapted to contact said liquid sample, said second pin defining said second electrode.

19. The apparatus of claim 2, further comprising: said pin being adapted to selectably transmit heat from said upper end of said pin to said lower end of said pin and to transmit said heat from said lower end of said pin to the liquid sample, said pin being further adapted to selectably transmit heat from the liquid sample to said lower end of said pin and from said lower end of said pin to said upper end of said pin, thereby selectably adding heat to or removing heat from the liquid sample.

20. The apparatus of claim 19, further comprising: means to selectably heat or cool said upper end of said pin.

21. The apparatus of claim 2 wherein said first pin is adapted to sonicate the liquid sample, further comprising: a sonic horn adapted to transfer sonic energy to said upper end of said pin.

22. An apparatus for electrical charge segregation of a liquid sample contained within a well of a well plate, the apparatus comprising:

a. a lid having an upper side and a lower side, said lower side of said lid being adapted to engage the well plate;

b. a pin having an upper end and a lower end, said upper end of said pin penetrating said upper side of said lid, said lower end of said pin extending through said lid and adapted to extend into the well;

c. said pin defining an anode, said anode having an anode surface, said anode surface being adapted to contact the liquid sample within the well of the well plate, said anode surface being adapted to exhibit a first user-selectable electrical charge to the liquid sample in response to a first electrical potential applied to said anode;

b. a cathode, said cathode having a cathode surface, said cathode surface adapted to contact the liquid sample within the well of the well plate, said cathode surface being adapted to exhibit a second user-selectable electrical charge to the liquid sample in response to a second electrical potential applied to said cathode;

c. a power supply adapted to provide said first electrical potential to said anode and said second electrical potential to said cathode.

23. The apparatus of claim 22, further comprising: said anode being adapted to be removed from the well and to be placed in a second well of a second well plate, whereby an anion electrically bound to said anode may be released into a second liquid sample of said second well plate.

* * * * *